United States Patent [19]
Van Aerle

[11] Patent Number: 5,808,717
[45] Date of Patent: Sep. 15, 1998

[54] LIQUID CRYSTAL DISPLAY WITH SAWTOOTH STRUCTURE

[75] Inventor: Nicolaas A. J. M. Van Aerle, Eindhoven, Netherlands

[73] Assignee: U.S. Philips Corporation, New York, N.Y.

[21] Appl. No.: 805,789

[22] Filed: Feb. 25, 1997

Related U.S. Application Data

[63] Continuation of Ser. No. 534,913, Sep. 28, 1995, abandoned.

[30] Foreign Application Priority Data

Oct. 6, 1994 [EP] European Pat. Off. ............. 94202896

[51] Int. Cl.⁶ .................................................. G02F 1/1337
[52] U.S. Cl. ........................... 349/129; 349/123; 349/124
[58] Field of Search ................................ 359/75, 77, 78, 359/95; 349/123, 124, 129, 201

[56] References Cited

U.S. PATENT DOCUMENTS

| | | | |
|---|---|---|---|
| 3,964,158 | 6/1976 | Janning | 359/78 |
| 3,967,883 | 7/1976 | Meyerhofer et al. | 359/76 |
| 4,146,656 | 3/1979 | Kinugawa et al. | 359/78 |
| 4,735,492 | 4/1988 | Sekine et al. | 359/75 |
| 4,917,472 | 4/1990 | Margerum et al. | 359/75 |
| 5,293,261 | 3/1994 | Shashidhar et al. | 359/87 |
| 5,438,421 | 8/1995 | Sugawara et al. | 359/75 |
| 5,473,455 | 12/1995 | Koike et al. | 359/76 |
| 5,504,604 | 4/1996 | Takatori et al. | 359/75 |
| 5,519,411 | 5/1996 | Okada et al. | 345/89 |

FOREIGN PATENT DOCUMENTS

| | | | |
|---|---|---|---|
| 56-19030 | 2/1981 | Japan | 359/75 |
| 1032-817 A | 2/1986 | Japan | 359/75 |
| 1138-534 A | 5/1989 | Japan | 359/75 |
| 1243-025 A | 9/1989 | Japan | 359/75 |
| 5-203951 | 8/1993 | Japan | 359/77 |
| 6-95121 | 4/1994 | Japan | 359/75 |
| 2 230 105 A | 10/1990 | United Kingdom | 359/75 |

OTHER PUBLICATIONS

"A Full–Color TFT–LCD With A Domain–Divided Twisted–Nematic Structure", by Y. Koike et al, SID 92 Digest, pp. 798–801.

*Primary Examiner*—William L. Sikes
*Assistant Examiner*—Toan Ton
*Attorney, Agent, or Firm*—John C. Fox

[57] ABSTRACT

Display device in which the viewing angle dependence is compensated by providing sub-cells having a mutually different viewing angle dependence via a replica method in which the liquid crystal orienting layer is given a sawtooth pattern. Orienting is realized by rubbing or by providing a Langmuir-Blodgett film. Due to variation of the angles of the sawtooth structure, different tilt angles with respect to the substrate are obtained in different areas.

9 Claims, 1 Drawing Sheet

LIQUID CRYSTAL DISPLAY WITH SAWTOOTH STRUCTURE

This is a continuation of application Ser. No. 08/534,913, filed Sep. 28, 1995 abandoned.

BACKGROUND OF THE INVENTION

The invention relates to a liquid crystal display device having a first supporting plate which is provided with at least one picture electrode and an orientation layer, and a second supporting plate which is provided with at least one counter electrode and an orientation layer, both plates enclosing a layer of liquid crystalline material, and two oppositely arranged parts of a picture electrode and the counter electrode defining a pixel.

Such display devices are generally used in, for example monitors, TV applications and, for example in display devices for motorcars and instruments.

A display device of the type mentioned in the opening paragraph is described in "A full colour TFT-LCD with a Domain-Divided Twisted-Nematic Structure", SID 92 Digest, pp. 798–801. In the domain-divided twisted-nematic LCD shown in this article, pixels are divided into sub-cells so as to reduce the viewing angle dependence, which angle dependence is different for both sub-cells; this is achieved by introducing different orientation or tilt angles for different parts of a cell on a surface. In the device shown in this article this is realised by providing, for a part of the cell, an orientation layer yielding a large tilt angle after rubbing on a layer yielding a small tilt angle after rubbing.

A drawback of this method is that two different layers of different materials must be provided, generally first a first (in)organic layer yielding a low (pre)tilt and subsequently a second organic layer yielding a high (pre)tilt. Moreover, admixing occurs at the interfaces when these layers are rubbed to obtain the ultimate tilt angle, so that undefined sub-cells (sub-pixels) are created.

OBJECTS AND SUMMARY OF THE INVENTION

It is, inter alia an object of the invention to provide an improved display device of the type described above, which can, moreover, be manufactured in a simpler manner.

To this end a display device according to the invention is characterized in that a pixel-defining part of the picture electrode is divided into at least two different areas, at least a first area of which has a sawtooth structure which is coated with an orientation layer.

Such a sawtooth structure may be provided in a simple manner by means of replica techniques, for example by giving a suitable monomer (for example, 1.6 hexanediol diacrylate) the desired shape by means of a die and subsequently curing it with UV radiation. A layer of orientation material is then provided on the layer thus obtained, which layer is oriented in the conventional manner (for example by rubbing, oblique vapour deposition or argon radiation). The sawtooth structure may consist of parts with the sawtooth directions facing each other, but alternatively of, for example a part having a sawtooth structure and a part without a sawtooth structure. The sawtooth structure may also be already present by necessity by virtue of subjacent structures, for example a top coat layer which has been patterned by means of a die and subsequently cured. If this top coat is thereafter coated with electrodes and subsequently with a layer of orienting material, these layers will follow the sawtooth profile.

The ultimate orienting layer now consists of a single material, which is not only advantageous for the manufacture but also for forming areas having an undefined orientation at the interfaces (for example due to damage during rubbing or accumulation of dust at an interface) and hence prevents irregularities in the cell division.

According to the invention, a preferred embodiment is characterized in that a second area is provided with an orientation layer having a sawtooth structure whose sawtooth direction is different from that of the first area. By giving the two areas different surfaces, the angle dependence can be adjusted in dependence on the application. More generally, this also applies to divisions into areas which are not obtained by means of a sawtooth structure.

The period of the sawtooth profiles used is preferably at least 2 μm. It has been found that in a shorter period during rubbing, parts of the orientation layer do not satisfactorily contact the rubbing agent or do not contact the rubbing agent at all (cloth or rubbing roll). On the other hand, to be effective, said period should be shorter than the dimension of a pixel.

One can refrain from rubbing in a device in which the orientation layer constitutes a Langmuir-Blodgett layer or a layer which can be given an orientation by way of photopolymerization. Such layers are capable of homogeneously orienting liquid crystal layers without the necessity of rubbing them. The drawbacks of rubbing (remaining dust particles, damage of the orientation layer or subjacent layers) are prevented thereby. The drawback of the Langmuir-Blodgett layer (or the photopolymerized layer) is that it usually introduces a too small tilt angle (0–0.2 degrees), but this is obviated by giving the sawtooth structure such angles that the liquid crystal material still acquires the desired tilt angle. This also applies to cells in which the sawtooth structure is not different for different parts of the cell.

BRIEF DESCRIPTION OF THE DRAWING

These and other aspects of the invention will be apparent from and elucidated with reference to the embodiments described hereinafter.

In the drawing:

FIG. 3 is a diagrammatic cross-section of a part of a liquid crystal display device in a further embodiment of the invention, while

The Figures are diagrammatic and not to scale. Corresponding elements usually have the same reference numerals.

DESCRIPTION OF THE PREFERRED EMBODIMENTS

Figure 1:
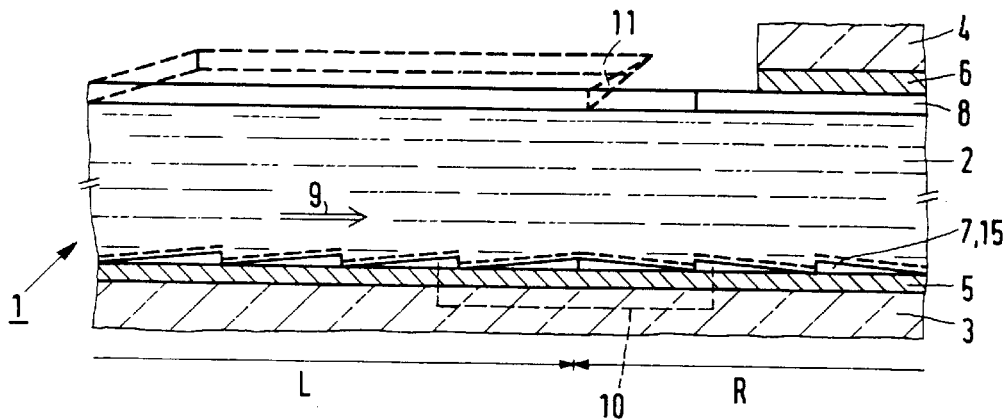
FIG. 1 is a diagrammatic cross-section of a part of a liquid crystal display device according to the invention.

FIG. 1 is a diagrammatic cross-section of a part of a liquid crystal display device comprising a liquid crystal cell 1 with a twisted-nematic liquid crystal material 2 which is present between two supporting plates or substrates 3, 4 of, for example glass, provided with electrodes 5, 6. For the sake of clarity, only a small part of the substrate 4 and the electrode 6 is shown. If necessary, the device comprises polarizers (not shown) whose directions of polarization are, for example perpendicularly crossed. The device further comprises orientation layers 7, 8 which orient the liquid crystal material on the inner walls of the substrates in such a way in this embodiment that the cell has a twist angle of 90 degrees. In this case the liquid crystal material has a positive optical anisotropy and a positive dielectric anisotropy.

Figure 2:
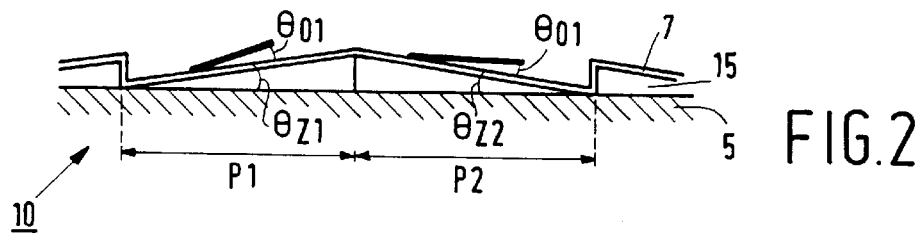
FIG. 2 shows a detail of FIG. 1.

According to the invention, the orientation layer 7 is provided on a layer 15 having a sawtooth structure which is divided into two parts in this embodiment, the structure at the left-hand part L having a sawtooth direction which is opposite to that in the right-hand part R in this embodiment. By rubbing the layer 7 of, for example polyimide in the direction of the arrow 9, tilt angles $\theta_{01}$ are induced at the surfaces of the sawtooth parts. If the sawtooth faces in the parts L and R extend at respective angles $\theta_{z1}$ and $\theta_{z2}$ to the substrate (see also FIG. 2, in which the part 10 of FIG. 1 is shown on a larger scale) it holds for the resultant tilt angles $\theta_1$ and $\theta_2$ of the liquid crystal molecules 11 with respect to the substrate that:

$$\theta_1 = \theta_{z1} + \theta_{01} \text{ and } \theta_2 = \theta_{z2} - \theta_{01}$$

To obtain equal but oppositely directed tilt angles $\theta_1$ and $\theta_2$ in both parts, $\theta_{z1}$ and $\theta_{z2}$ should be suitably chosen. This may simply be realised by adapting the sawtooth structure in one of the two parts. If the sawtooth structures in both parts are characterized by a pitch $p_1$ and $p_2$, respectively, it preferably holds that $p_1 \cdot \tan\theta_{z1} = p_2 \cdot \tan\theta_{z2}$ so as to prevent differences in thickness between the two structures.

The pitch p is preferably chosen to be much smaller than the dimensions of a pixel or picture cell. If the pitch approximates the dimension of a pixel, there is no question of dividing a pixel. The pitch may neither be too large because (at a given angle $\theta$) the height of the sawtooth should be small with respect to the thickness of the cell so as to prevent discolouration.

In a practical example a 1.6 hexanediol diacrylate cured by UV radiation was provided on a glass substrate and given a sawtooth structure by means of a die, which sawtooth structure had an angle $\theta_z$ of approximately 1 degree and subsequently cured. The sawtooth structure thus obtained was subsequently provided with a polyimide introducing an angle $\theta_{01}$ of approximately 0.5 degree. A number of substrates with orientation layers thus obtained was subsequently rubbed parallel and antiparallel to the sawtooth direction and processed to form cells. At areas with the rubbing direction parallel to the sawtooth direction, the resultant cells had a tilt angle $\theta$ of approximately 1.4 degrees, which practically corresponds to $\theta_{z1} + \theta_{01}$, and at areas with the rubbing direction antiparallel to the sawtooth direction the cells had a tilt angle $\theta$ of approximately 0.5 degree which practically corresponds to $\theta_{z2} - \theta_{01}$.

Although the two parts L and R in FIG. 1 are provided with a sawtooth structure, it is alternatively possible to provide only one of the two parts with such a structure and to leave the other part plane.

In FIG. 1, the counter electrode 6 is provided with an orienting layer 8 which is not provided with a sawtooth structure in this example. Of course, such a structure may be provided as is shown diagrammatically in FIG. 1 by means of the broken lines 11. Upon division into two different orientation areas for each cell on the two substrates, four sub-cells 1A, 1B, 1C, 1D are produced which are defined by the oppositely arranged parts 3A (with tilt angle $\theta_1$) and 3B (with tilt angle $\theta_2$) of substrate 3 and the parts 4A (with tilt angle $\theta_1'$) and 4B (with tilt angle $\theta_2'$) of substrate 4.

Figure 3:
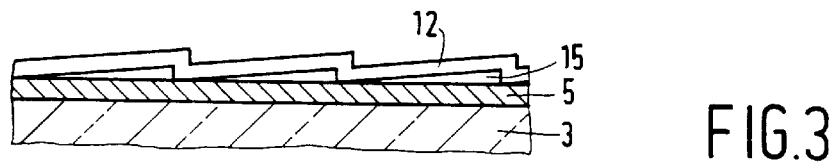

FIG. 3 shows another embodiment in which rubbing for the purpose of orientation need not be carried out because a Langmuir-Blodgett film 12 of a suitable polyimide is provided on the sawtooth-shaped orientation layer. As is known, such Langmuir-Blodgett films are capable of orienting liquid crystal layers homogeneously, but they do not introduce a tilt angle themselves and are obtained by providing a plurality of molecular layers in accordance with the Langmuir-Blodgett method. By providing the Langmuir-Blodgett film on the sawtooth structure, a tilt angle with respect to the substrate is nevertheless introduced.

Figure 4:
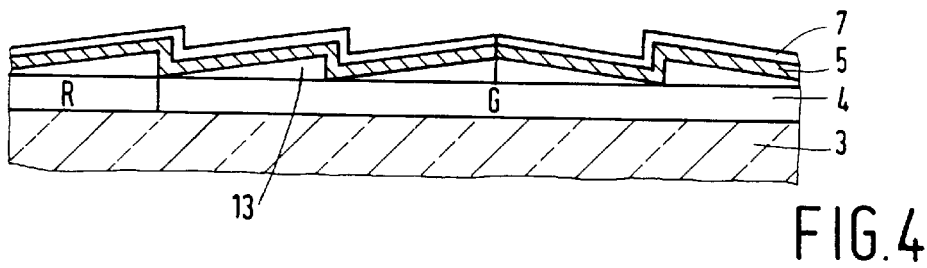
FIG. 4 is a diagrammatic cross-section of a part of a liquid crystal display device in accordance with another embodiment of the invention.
Figure 5:
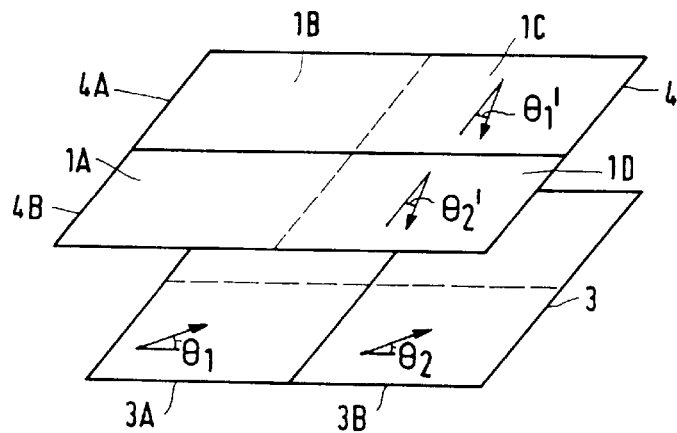
FIG. 5 shows diagrammatically another embodiment of the invention.

FIG. 4 shows a further embodiment in which the electrode 5 is provided on a layer 13 of top coat material, which layer protects, for example a subjacent colour filter 14. The top coat material comprises, for example an acrylic resin to be cured by UV radiation or a thermoplastically deformable layer, for example an epoxy resin in which the desired sawtooth-shaped profile has been provided by means of a die. The orientation layer 6 is provided on the electrode 5, which layer is subsequently rubbed again or provided with a Langmuir-Blodgett film.

Instead of a Langmuir-Blodgett film, a photosensitive material may alternatively be provided which is capable of orienting liquid crystal material by exposing it to linearly polarized (UV) light such as, for example, polyvinyl cinnamate. The exposure causes a chemical reaction in the material (cross-linkage) so that the molecular orientation acquires a preferred direction and thus causes an orientation in the liquid crystal.

The invention is of course not limited to the examples shown. For example, the angle dependence may be optimized by choosing different sizes for the surfaces of the sub-cells. This more generally applies to methods of picture cell division and to the domain-divided twisted-nematic cell mentioned in the opening paragraph. Also the solution of providing Langmuir-Blodgett-like layers with a tilt angle by providing them on a sawtooth structure is not necessarily limited to display devices in which the picture cells are divided into sub-cells. The sawtooth structure may alternatively extend in a direction across the entire substrate. The examples are based on a liquid having a positive dielectric anisotropy. However, the invention is also applicable to liquids having a negative dielectric anisotropy.

In summary, the invention relates to a display device in which the viewing angle dependence is compensated by providing sub-cells having a mutually different viewing angle dependence via a replica method, in which the liquid crystal orienting layer acquires a sawtooth pattern. The orientation is realised by rubbing or by providing a Langmuir-Blodgett film. Due to variation of the angles of the sawtooth structure, different tilt angles with respect to the substrate are obtained in different areas.

I claim:

1. A liquid crystal display device having a first supporting plate which is provided with at least one picture electrode area and an orientation layer, and a second supporting plate which is provided with at least one counter electrode and an orientation layer, both plates enclosing a layer of liquid crystal material and two oppositely arranged parts of a picture electrode area and the counter electrode defining a pixel, characterized in that a pixel-defining part of the picture electrode area is divided into at least two different sub-areas, wherein at least one of the sub-areas comprises a stack of at least an electrode layer and an orientation layer above said electrode layer, said stack having a sawtooth structure of a pitch of at least 2 μm but shorter than the dimensions of a pixel.

2. A liquid crystal display device as claimed in claim 1, characterized in that a second area has a sawtooth structure which is coated with an orientation layer and whose sawtooth direction is different from that of the first area.

3. A liquid crystal display device as claimed in claim 2, characterized in that the first and the second area differ in surface.

4. A liquid crystal display device as claimed in claim 2, characterized in that the surface of the sawtooth structure is provided with a Langmuir-Blodgett film.

5. A liquid crystal display device as claimed in claim 2, characterized in that the surface of the sawtooth structure is provided with a layer of photosensitive material into which a preferred direction is introduced by means of linearly polarized light.

6. A liquid crystal display device as claimed in claim 1, characterized in that the pixel-defining part of the counter electrode is divided into at least two different areas, at least a first area of which has a sawtooth structure which is coated with an orientation layer.

7. A liquid crystal display device as claimed in claim 1, characterized in that the sawtooth structure has a period of at most the dimension of a pixel.

8. A liquid crystal display device as claimed in claim 1, characterized in that the surface of the sawtooth structure provided with a Langmuir-Blodgett film.

9. A liquid crystal display device as claimed in claim 1, characterized in that the surface of the sawtooth structure is provided with a layer of photosensitive material into which a preferred direction is introduced by means of linearly polarized light.

* * * * *